US00RE39410E

(19) United States
(12) Reissued Patent
Kaneko et al.

(10) Patent Number: US RE39,410 E
(45) Date of Reissued Patent: Nov. 28, 2006

(54) WHITE BALANCE ADJUSTING DEVICE FOR A CAMERA

(75) Inventors: Kiyotaka Kaneko, Tokyo (JP); Izumi Miyake, Tokyo (JP); Kazuya Oda, Tokyo (JP); Yoshio Nakane, Tokyo (JP); Hiroshi Shimaya, Tokyo (JP)

(73) Assignee: Fuji Photo Film Co., Ltd., Kanagawa (JP)

(21) Appl. No.: 09/692,107

(22) Filed: Oct. 20, 2000

Related U.S. Patent Documents

Reissue of:
(64) Patent No.: 4,899,212
Issued: Feb. 6, 1990
Appl. No.: 07/366,210
Filed: Jun. 15, 1989

U.S. Applications:
(63) Continuation of application No. 07/236,992, filed on Aug. 26, 1988, now abandoned.

(30) Foreign Application Priority Data

Aug. 28, 1987 (JP) ..... 62-214382
Aug. 28, 1987 (JP) ..... 62-214383

(51) Int. Cl.
*H04N 9/73* (2006.01)
*H04N 5/225* (2006.01)

(52) U.S. Cl. ..... 348/223.1; 348/220.1; 348/227.1

(58) Field of Classification Search ..... 348/220, 348/223, 224, 225, 227, 226, 228, 655, 225.1, 348/226.1, 227.1, 207.99, 220.1, 222.1, 223.1, 348/224.1, 228.1
See application file for complete search history.

(56) References Cited

U.S. PATENT DOCUMENTS 3,626,088 A * 12/1971 Schneider ..... 358/29 C
4,273,426 A 6/1981 Iwama et al.
4,281,337 A * 7/1981 Nakamura (Continued)

FOREIGN PATENT DOCUMENTS

| | | | |
|---|---|---|---|
| JP | 55-30265 | * 3/1980 | ..... 358/29 C |
| JP | 56-4993 | * 1/1981 | ..... 358/29 C |
| JP | 60-254980 | * 12/1985 | ..... 358/29 C |
| JP | 61-240790 | * 10/1986 | |

OTHER PUBLICATIONS

"Video Movies", by Tony Galluzo, Modern Photography, Dec. 1981 (Galluzo Publication).
Definitions of "adjust" and "set" from ROGETS' II The New Thesaurus, 1980.
Definition of "sequence" from Webster's Third New International Dictionary.

(Continued)

*Primary Examiner*—David Ometz
*Assistant Examiner*—Luong T. Nguyen
(74) *Attorney, Agent, or Firm*—Birch, Stewart, Kolasch & Birch, LLP

(57) ABSTRACT

A white balance adjusting device for use in a camera which photographs a field and forms a video signal representing the field. In the white balance adjusting device, while a sequential photographing is under way, updating of the color temperature data to be used for adjusting a white balance is prohibited. Therefore, the hues of main objects in the respective frames of still images photographed by the sequential photographic operation remain unchanged, thereby maintaining the homogeneity of the main objects. Also, in the white balance adjusting device, control a device is used to provide a short response time for a quick response property in a still mode and to provide a longer response time in a movie mode when compared with the still mode. As a result, the white balance can be adjusted according to the photographic modes of the camera.

16 Claims, 4 Drawing Sheets

U.S. PATENT DOCUMENTS 4,506,290 A * 3/1985 Hashimoto ..... 348/225.1
4,524,381 A * 6/1985 Konishi ..... 358/29 C
4,558,368 A * 12/1985 Aoki et al. ..... 358/909 X
4,584,598 A * 4/1986 Kutzragi ..... 358/29 C
4,590,512 A * 5/1986 Kondo
4,595,946 A * 6/1986 Uehara et al.
4,599,657 A * 7/1986 Kainoshita et al. ..... 358/909 X
4,605,955 A * 8/1986 Hashimoto et al. ..... 358/29 C
4,633,300 A * 12/1986 Sakai ..... 358/29 C
4,646,161 A * 2/1987 Tsuchiya et al. ..... 358/41 X
4,736,241 A * 4/1988 Murakami et al. ..... 348/225.1
4,739,392 A * 4/1988 Ueda et al. ..... 358/29 C
4,739,393 A * 4/1988 Seki et al. ..... 348/225.1
4,774,564 A * 9/1988 Konishi ..... 358/41 X
4,805,010 A * 2/1989 Shroyer et al. ..... 358/41 X
4,843,456 A * 6/1989 Iida et al. ..... 348/226.1
5,021,875 A * 6/1991 Iida et al. ..... 348/227.1
5,170,069 A 12/1992 Sakai
6,266,083 B1 * 7/2001 Sakaegi et al. ..... 348/207.99

OTHER PUBLICATIONS

Definition of "field" from the IEEE Standard Dictionary of Electrical and Electronics Terms, Fourth Edition, 1988.

"Cine Camera", by George H. Sewell and Julien Caunter, pp. 199–212 of The Focal Encylopedia of Photogrphay, 1969 (Cine Article).

Definitions of "cinematograph", and "cinematography" from Webster's Ninth New Collegiate Dictionary, 1985.

* cited by examiner

WHITE BALANCE ADJUSTING DEVICE FOR A CAMERA

Matter enclosed in heavy brackets [ ] appears in the original patent but forms no part of this reissue specification; matter printed in italics indicates the additions made by reissue.

This application is a continuation of application Ser. No. 236,992, filed on Aug. 26, 1988.

BACKGROUND OF THE INVENTION

1. Field of the Invention

The present invention relates to a white balance adjusting device for use in a camera in which the image of a field to be photographed is picked up and then a video signal representing the field is created.

2. Description of the Related Art

Recently, there has been developed an attractive electronic still camera system wherein an image pickup device, such as a solid image pickup element, an image pickup tube or the like, is combined with a recording device employing, as a recording medium, an inexpensive magnetic disc having a comparatively higher memory capacity for photographing an object electronically recording the object into the rotating magnetic disc and reproducing an image by a television system or a printer separately provided.

In the above-mentioned electronic still cameras, there is included an electronic still camera which is provided with a photographic mode including a still mode wherein an image of a field is picked up and is then recorded as a still image and a movie mode wherein the camera can photograph a field as a movie camera by connecting a video adapter to the camera. In this type of electronic still camera, to record a color image, the white balance of the camera must be adjusted in accordance with the kinds of illumination lights in photographing, according to or regardless of whether the photographic mode is the still mode or movie mode.

Because a color camera cannot adapt itself to colors like human eyes do, the color camera must be adjusted such that even in a television receiver the black and white colors of the field can be seen as black and white as they actually are. For this reason, in order to make the color separation components of a video signal obtained from an image pickup device uniform according to the color temperatures of the illumination lights, the camera white balance adjustment is performed to thereby adjust the amplification gains thereof.

In general, a movie camera (video camera) is set to have a property of a comparatively slow response from the input of the color temperature data of the field by the color temperature detection device thereof to the execution of the white balance adjustment. This slow response results because the color temperatures in the natural world vary in a wide range of time but the variations thereof are normally slow.

In other words, in the movie camera, because great importance is placed on the correlation (continuity) of the screen thereof, the response property for the white balance adjustment is set slow.

On the other hand, when the electronic still camera is set in the still mode for photographing, a shutter chance occurs in an instant and thus the white balance adjustment must be carried out in accordance with the color temperature of the field in that instant. For example, such a case may occur in which, after the camera is directed toward a room, the camera is directed in an instant outside of the room for photographing.

By the way, the still mode of the electronic still camera includes a single photographic mode and a sequential photographic mode. The single photographic mode is a basic operation mode in which when a shutter release is executed, the image of the field is picked up by a frame and a video signal representing the still image thereof is recorded.

On the other hand, the sequential photographic mode is an operation mode in which, while the shutter release is being executed, the image of the field is picked up sequentially every given period of the time and a video signal representing the still image thereof is recorded.

In the single photographic mode, as discussed above, the white balance adjustment must be made in compliance with the color temperature of the field in the instant of the shutter release, but this cannot apply to the sequential photographic mode. That is, due to the fact that the reflected light of the field (object) is detected by a color temperature sensor and the white balance adjustment is made by a control part according to the detected output of the sensor, when the sequential photographic mode is used to photograph, for example, a moving object, if the background of the object is varying in succession, then the white balance adjustment must be made according to the variations of the color temperature of the varying background.

As a result of this, the image of the object is tinged with the color of the background, which damages the homogeneity (which means that the object is photographed substantially in the same color hue) of the same main object in a plurality of still images picked up by means of the sequential photographic mode.

In the sequential photographic mode, as in the movie mode, due to the high correlation between a series of images photographed, the homogeneity of the main object is required.

SUMMARY OF THE INVENTION

The present invention aims at eliminating the drawbacks found in the above-mentioned conventional devices.

Accordingly, it is a first object of the invention to provide a camera white balance adjusting device which is capable of maintaining the homogeneity of a main object regardless of the variations of the color temperature of a field when photographing a still image by means of a sequential photographic mode.

It is a second object of the invention to provide a camera white balance adjusting device which is capable of changing properly the response property of a camera from the detection of the color temperature of a field up to the execution of a white balance adjustment.

In order to achieve the first object, according to one aspect of the invention, there is provided a white balance adjusting device for use in a camera which includes at least a single photographic mode in which, when a shutter release operation is performed, an image of a field is picked up by a single frame and a video signal representing the still image thereof is formed and a sequential photographic mode in which, while the shutter release operation is being performed, the images of the field are picked up sequentially at every given time and video signals respectively representing the still images thereof are formed. The white balance adjusting device includes a single/sequential photographic modes setting device for setting the photographic mode of the camera to either the single photographic mode or the sequential photographic mode, an operation device for performing the shutter release operation, a color temperature detecting device for detecting the color temperature of the field and outputting a color temperature signal representing the detected color temperature, and a control device for adjusting the white balance of the video signal(s) in accordance with the color temperature data that are obtained from the color temperature signal. The control device takes the set output of the single/sequential photographic mode setting device and the output signal of the operation device and, while a sequential photographic operation is being performed, prohibits updating of the color temperature data that is used for the white balance adjustment.

In the white balance adjusting device for use in a camera according to the invention, a state wherein the photographic mode is set in the still mode operate the single/sequential photographic mode setting device to set up the sequential photographic mode.

When the sequential photographic mode is set and the shutter release operation is performed by the operation device, then the sequential photographic operation is executed.

While the sequential-photographic operation is being performed, the control device prohibits updating of the color temperature data to be used for the white balance adjustment.

As mentioned above, according to the invention, since the updating of the color temperature data is prohibited during the sequential photographic operation, the color hue of the main object in the respective framewise still images photographed by means of the sequential photographic operation remains unchanged, so that the homogeneity of the main object can be maintained.

Further, in attaining the second object, according to another aspect of the invention, there is provided a white balance adjusting device for use in a camera in which a field is photographed and a video signal representing the field is formed. The device includes a photographic mode setting device for setting either a still mode for photographing the field as a still image or a movie mode for photographing the field as a moving image, a color temperature detecting device for detecting the color temperature of the field and outputting a color temperature signal representing the color temperature, and a control device for adjusting the white balance of the video signal in accordance with the color temperature data that is obtained from the color temperature signal. The control device takes the set output of the photographic mode setting device and, when the photographic mode is set in the still mode, adjusts the white balance of the video signal at a shorter cycle when compared with the movie mode.

In the white balance adjusting device for use in a camera according to the invention, the still mode or the movie mode is set by means of the photographic mode setting device. When the photographic mode is set in the still mode for photographing the field as a still image, to provide a quick response, a response time required from the detection of the color temperature of the field up to the execution of the white balance adjustment is controlled to a short amount of time by the control device. In the movie mode, to be able to provide a response property similar to a conventional movie camera, the abovementioned response time is controlled by the control device such that the time is longer than the time in the still mode.

Thus, according to the invention, the white balance adjustment suitable for the photographic mode can be realized.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

A detailed description will hereunder be given for the preferred embodiments of a white balance adjusting device according to the present invention with reference to the accompanying drawings.

Figure 1:
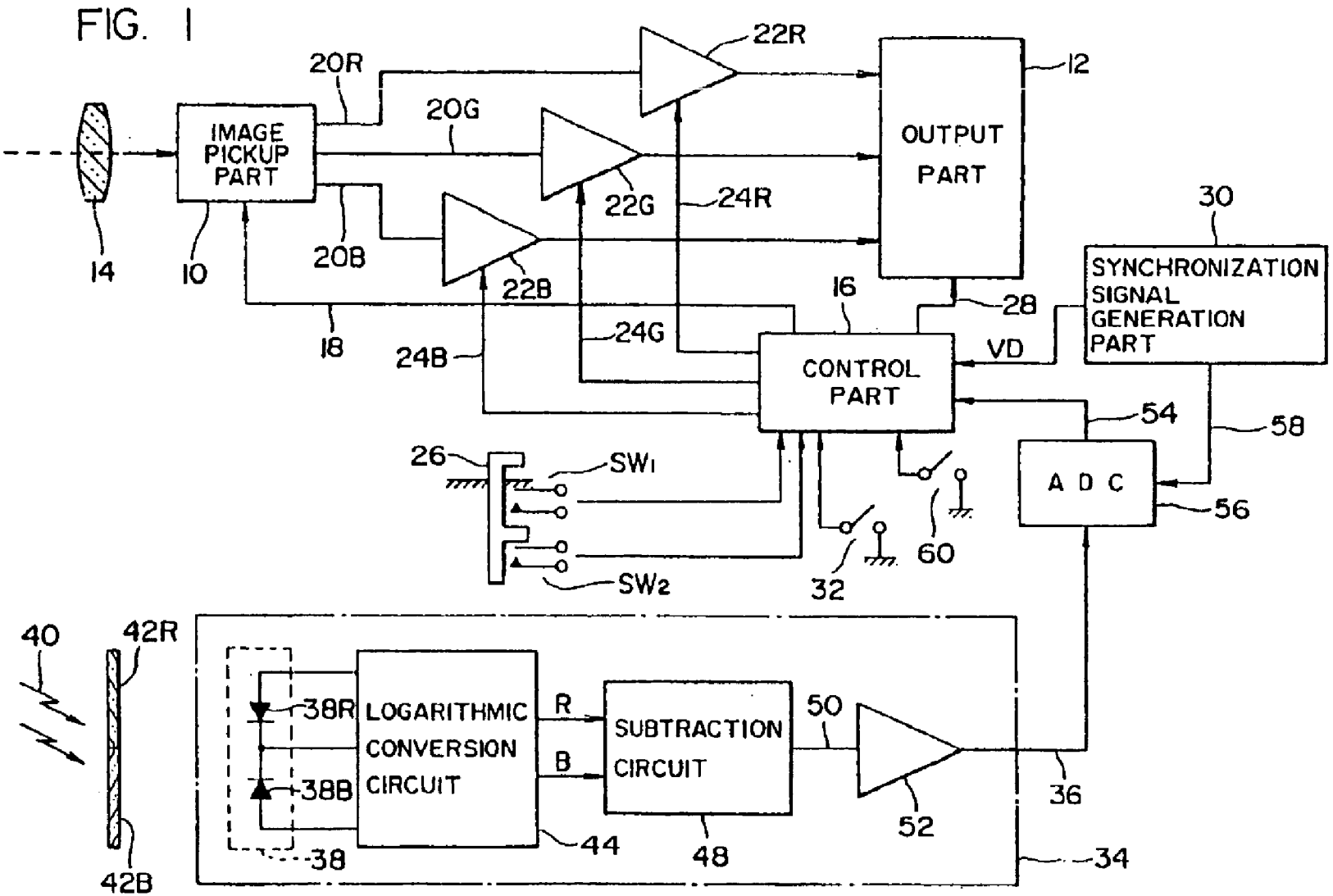
FIG. 1 is a block diagram of the structure of an embodiment of a white balance adjusting device for use in an electronic still camera according to the invention.

Referring first to FIG. 1, there is shown a block diagram of the structure of an embodiment of a white balance adjusting device for use in an electronic still camera according to the invention. In FIG. 1, the white balance adjusting device is mainly composed of an image pickup part 10, amplifiers 22R, 22G and 22B which respectively amplify the separation color signals 20R, 20G and 20B of three primary colors output from the image pickup part 10, an output part 12, a control part 16, a synchronization signal generation part 30, a mode select switch 32 for selecting either a single photographic mode or a sequential photographic mode, a color temperature detection part 34, and an A/D converter 56, and a mode setting switch 60 for setting a photographic mode.

The image pickup part 10 has an image pickup mechanism including a color solid image pickup device such as a CCD and the like. The image of an object is focused on the image pickup cell array of the image pickup device by an image pickup lens 14, and the image pickup device creates a video signal corresponding to the image of the object.

The image pickup part 10 receives a drive clock from the control part 16 through a control line 18. In response to the drive clock the signals that are separated into three primary color components R, G and B are outputted to the amplifiers 22R, 22G and 22B, respectively.

Also, the image pickup part 10 has a shutter and a diaphragm which are used to limit the exposure to the image pickup device. These operations are controlled by the control part 16 through the control line 18.

The amplifiers 22R, 22G and 22B are variable gain amplifiers arranged such that the amplification gains thereof can be adjusted by the control signals 24R, 24G and 24B that are output from the control part 16, respectively.

The mode setting switch 60 is a switch which is used to set the photographic mode of the camera into either a still mode in which a field is photographed as a still image or a movie mode in which the camera is used as a movie camera to photograph a field as a moving image. When this switch is turned on, the photographic mode is set into the movie mode, and, when the switch is turned off, the photographic mode is set into the still mode. The output part 12, in particular, is composed of an output terminal which is used to output externally of the device the video signals that are output from the amplifiers 22R, 22G and 22B, a recording section to record the video signal as a still image into a magnetic disc, and a switching circuit which is controlled by a control signal 28 output from the control part 16 to switch the video signals output from the amplifiers 22R, 22G and 22B to the output terminal side thereof or the still image recording section side thereof according to the photographic mode. The above-mentioned output terminal is arranged such that a movie adapter serving as a recording part in which a video signal recorded into a video tape can be connected to the terminal in order that the electronic still camera can be operated as a movie camera when the photographic mode is set into the movie camera.

The control part 16 is composed of a microcomputer and the like and is a control circuit which, responsive to a vertical synchronization signal VD supplied from the synchronization signal generation part 30 to a control line 32, controls the respective parts of the present white balance adjusting device. For example, it controls the exposure of the image pickup part 10 responsive to a photographic instruction by an operator, or controls the recording and outputting operations of the output part 12. Also, the control part 16 performs various kinds of controls in photographing such as a focusing control, an exposure adjustment, a white balance adjustment and the like.

The color temperature detection part 34 is a circuit which detects the color temperature of the field and outputs a color temperature signal corresponding to the detected color temperature. In the illustrated embodiment, the color temperature signal 36 is output through the A/D converter 56 to the control part 16.

The color temperature detection part 34 includes a color temperature detection element 38 which receives an incident light 40 from the field to which the image pickup lens 14 is directed, and also causes a photocurrent to change responsive to the incident light. In the incident light side of the temperature detection part 34, there are arranged an optical filter 42R which will transmit the red (R) component of the incident light 40, and an optical filter 42B which will transmit the blue (B) component of the incident light.

The color temperature detection element 38 includes a pair of photo diodes 38R and 38B which are connected in series to each other at their mutually reversed polarities, and the respective electrodes thereof are connected to a logarithmic conversion circuit 44. The photo diodes 38R and 38B are disposed to correspond to the optical filters 42A and 42B, respectively. The logarithmic conversion circuit 44 is a circuit which operates the values of electric currents flowing through the photo diodes 38R and 38B in a logarithmic compression manner responsive to the photocurrents of the photo diodes 38R and 38B. From the output terminal of the logarithmic conversion circuit 44, a signal R corresponding to the R component of the incident light 40 and a signal B corresponding to the B component of the incident light 40 are output to a subtraction circuit 48. The subtraction circuit 48 is an operation circuit which operates a difference between both signals R and B and outputs to an amplifier 52 a direct current level signal corresponding to the difference and polarity.

A release button designated by 26, can be operated in a two stroke manner. That is, when the release button 26 is operated in the first stroke thereof, a switch SW1 is closed to thereby supply electric power to the respective circuit parts of the device, and when the release button 26 is further pushed into its second stroke, a switch SW2 is closed. At the time when the switch SW2 is closed, the control part 16 operates such that the shutter release, photographing, and recording operations are executed.

The mode select switch 32 is a switch which selects either the single photographic mode in which, when the shutter release operation is executed, the field is photographed by one frame and the video signal representing the still image thereof is recorded into a recording medium, or the sequential photographic mode in which, while the shutter release operation is being executed, the field is photographed sequentially every given time and the video signals representing the still images thereof are recorded into a recording medium. In the sequential photographic mode, during a period in which the switch SW2 of the release button 26 is on, the photographing and recording of the field are performed every given time (for example, 1/6 sec., 1/10 sec.).

The sequential photographic operation is executed when the mode select switch 32 is set to the sequential photographic mode (the on state thereof) and the release button 26 is depressed to thereby turn on the switch SW2.

In addition, actually, there is provided a setting switch for setting a sequential photographic speed (which is represented by the number of frames per second), but a detailed description thereof is omitted here.

In the above-mentioned structure, there is produced a difference between the photocurrents of the photo diodes 38R and 38B according to the ratio of the R component of the incident light 40 to the B component thereof, and the difference is input to the logarithmic conversion circuit 44 as an electric current signal. This electric current signal is logarithmically compressed in the logarithmic conversion circuit 44 and is then input to the subtraction circuit 48. In the subtraction circuit 48, a difference between the two component signals R and B is operated, and a signal representing this difference is amplified in the amplifier 52 and is then output therefrom in the form of a direct current level signal. This output signal, in particular, is output as a direct current level signal having positive and negative signs which correspond to the magnitude of the difference between the R and B components and the polarities thereof. Upon receiving a clock signal 58 from the synchronization signal generation part 30, the A/D converter 56 converts the direct current level signal into the digital data that corresponds to the direct current level signal, and then outputs the digital data to the control part 16.

Then, the control part 16 executes the processing to be discussed later, inputs therein the data that represents the difference between the R component light and the B component light. That is, color temperature data from the A/D converter 56 in synchronization with the vertical synchronization signal VD that is output from the synchronization signal generation part 30, and the color temperature data is analyzed so as to decide the color temperature of the incident light 40. In accordance with the decision results, the control part 16 adjusts the gains of the variable gain amplifiers 22R and 22B, or, according to circumstances, the gain of the variable gain amplifier 22G, so that, with respect to the white light that enters the image pickup part 10 through the image pickup lens 14, the levels of the video signals that are output from the three amplifiers 22R, 22G and 22B to the output part 12 are relatively and substantially equal to one another. As a result, in the present device, the white balance of the video signals that are obtained in the output part 12 can be adjusted properly.

Figure 2:
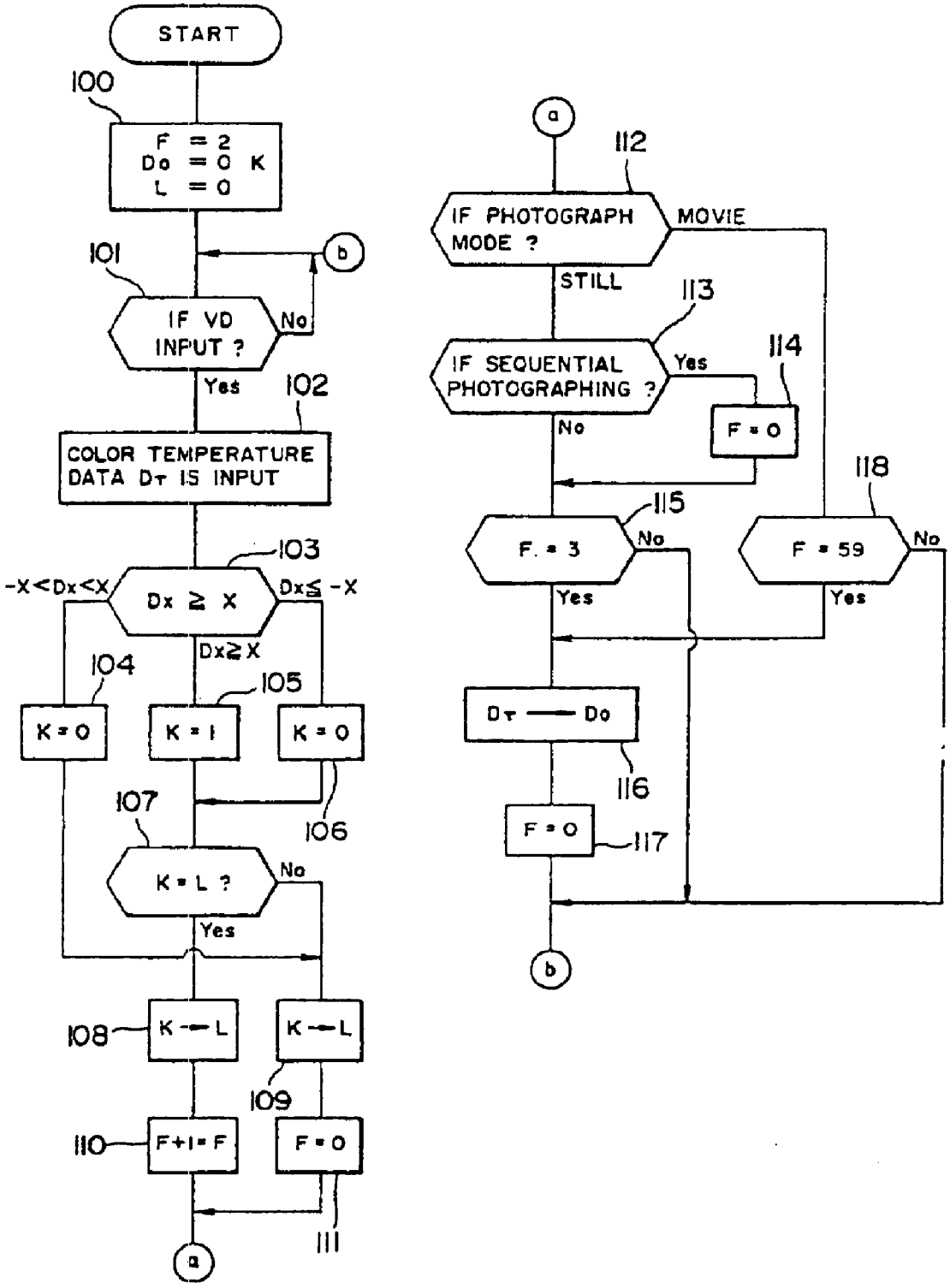
FIG. 2 is a flow chart of the contents of a program to be executed by a control part shown in FIG. 1.
Figure 3:
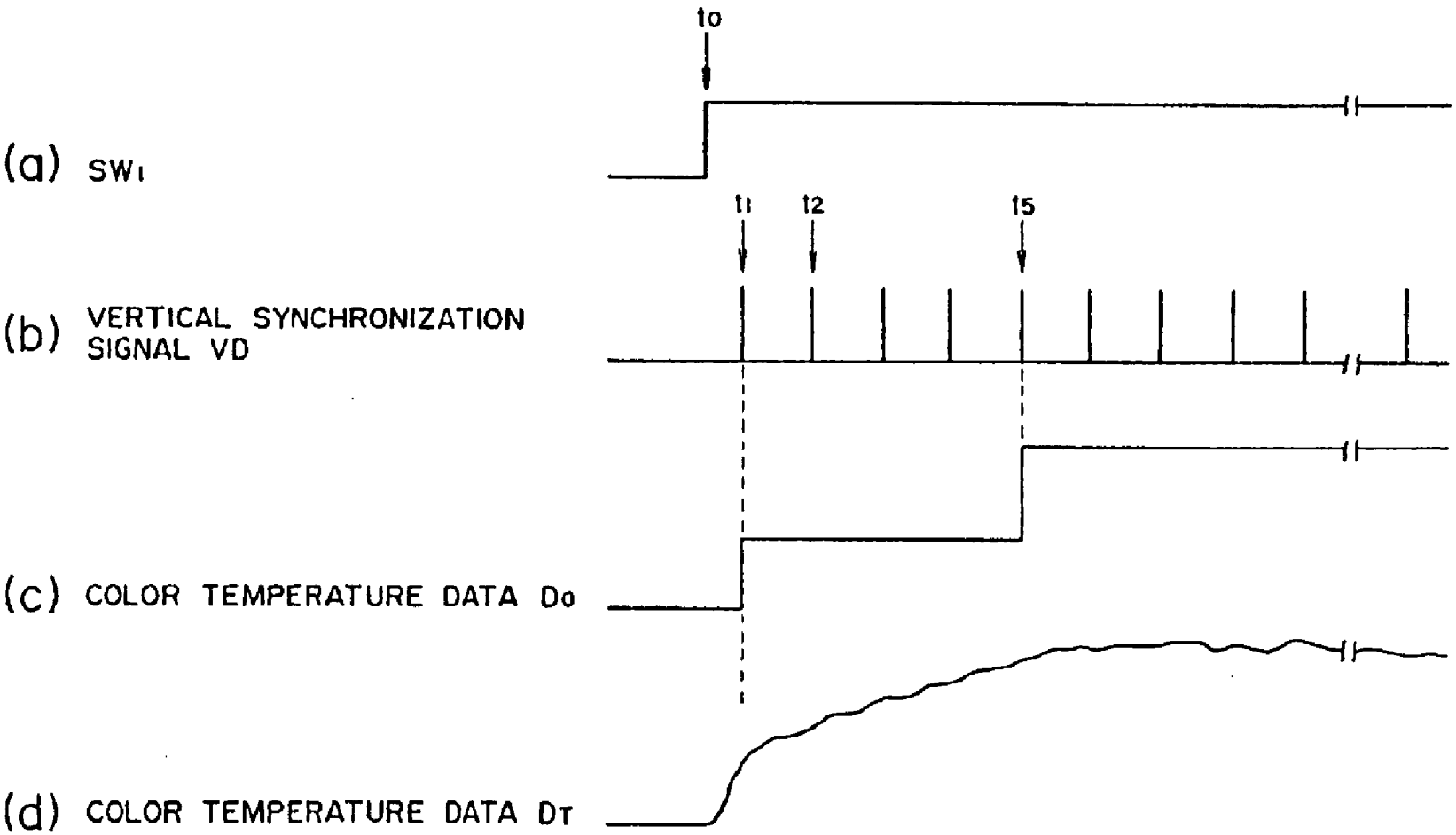
FIG. 3 is a timing chart used to explain a state in which a color temperature data $D_O$ is updated; and, FIG. 4 is a block diagram of the structure of the main portions of a second embodiment of a white balance adjusting device according to the invention.

Next, a description will be given below of the contents of the color temperature data taking-in routine to be executed by the control part 16 with reference to the flow chart in FIG. 2 and the timing chart in FIG. 3. In these figures, if the switch SW1, which serves as a power switch, of the release button 26 is turned on at a time $t_1$ (FIG. 3(a)), then the program is initiated, whereby an initialization is executed in Step 100.

Here, a reference character F stands for the count value of a soft counter which counts the number of processings of this routine. $D_O$ represents the color temperature data that is used for the white balance adjustment; and, L represents a flag indicating the previous state of a flag K. The above-mentioned flag K is a flag which is set or reset in accordance with whether a difference $D_X$ between the color temperature data $D_O$ and the color temperature data $D_T$ that is input from the A/D converter 56 is beyond a given range or not.

In the still mode in which a time required from application of power of a camera to a state thereof prepared for photography is very short, it is necessary to shorten a response time required from the taking-in of the color temperature data up to the start of processing the signal for the white balance adjustment. Therefore, in order to be able to establish the color temperature data $D_O$ to be used for the white balance adjustment by processing the routine only one time, in the initialization, F=2, $D_O$=OK, L=0 are set, respectively. Although the color temperature data $D_O$ (in common with $D_T$) is actually not given in the unit of "K", the above-mentioned expression is employed here for convenience of explanation.

Now, after execution of the initialization, in Step 101 whether or not the vertical synchronization signal VD is input from the synchronization signal generation part 30 to the control part 16 is checked. If the signal is not input yet, the program waits until the vertical synchronization signal VD is input, and the program goes to Step 102 at the time (a time $t_1$ (FIG. 3(b)) when the vertical synchronization signal VD is input.

In Step 102, the color temperature data $D_T$ is taken in by the A/D converter 56 in synchronization with the vertical synchronization signal VD (at the time $t_1$).

By means of processing in Steps 103~109, whether or not the difference $D_X(=D_O-D_T)$ between the color temperature data $D_O$ and the color temperature data $D_T$ that is taken in Step 102 has changed in the same direction with the lapse of time is checked.

In particular, at first, in Step 103, whether or not $D_X$=X is checked. Here, X is set to a proper value (in the illustrated embodiment, X=100K), so that the color temperature data $D_O$ is to be updated only when the color temperature of the field is clearly changed but the color temperature data $D_O$ is not to be updated for the slight change of the field color temperature.

Since $D_O$=OK is already set, in Step 103 $D_X=-D_T$ is obtained, and, due to the fact that the color temperature of the illumination light of the field in photographing is at least 2,000~3,000K, then $D_X \leqq -X$ is obtained. Therefore, in this case, in Step 106 the flag k is reset, and then in Step 107 whether or not K=L is checked. Since L=0 is set in the initialization, then K=L=0 is obtained. Accordingly, the content of the flag K is considered as the content of the flag L, that is, L=0 is decided and the content of the counter F is incremented by 1 (Steps 108, 110).

Since the content of the counter F is set as F=2 in the initialization, as a result of the incrementation thereof in Step 110, F=3 is obtained.

In Step 112, it is checked whether the photographic mode that is set in accordance with the set output of the mode setting switch 60 is in the still mode or in the movie mode. If it is decided to be the still mode, then whether or not the mode is set during the sequential photographing is checked. If the mode is decided to be set during the sequential photographing, then the program advances to Step 115 after the counter F is reset. If the mode is not set during the sequential photographing, the program goes directly to Step 115 (Step 113, 114).

Whether or not the still mode is set during the sequential photographing is checked by whether the switch SW2 of the shutter release button 26 is on and the sequential photographic mode switch 32 is on.

The reason why the counter F is reset in the above-mentioned manner when the still mode is during the sequential photographic mode is because in the sequential photographic mode the photographs that are taken sequentially have a high correlation with respect to one another as in the movie mode, updating of the color temperature data $D_O$ can be prohibited so that the hue of the main object cannot be changed.

Further, in Step 115, the content of the counter F is checked, that is, whether F=3 or not is checked. If F≠3 is found, then the program goes back to Step 101. However, since, the program is initiated and this routine is first executed, F=3 has been already obtained in Step 110. Therefore, in Step 116, the color temperature data $D_T$ that is taken from the A/D converter 56 in Step 102 is considered as the color temperature data $D_O$ to be used for the white balance adjustment (at the time $t_1$ (FIGS. 3(c), (d)), and in Step 117 after the counter F is reset the program goes back to Step 101. Therefore, when the program is initiated and this routine is first executed, the color temperature data $D_T$ of the actual field is used as the color temperature data $D_O$ in Step 117, so that a ready white balance adjustment is possible.

Similarly, if the vertical synchronization signal VD is input at a time $t_2$ in Step 101, then the color temperature data $D_T$ is input (Step 102). Furthermore, in Step 103 the difference between the previous and current color temperature data is checked, that is, whether or not $D_X \geqq X$ is checked.

When $-X<D_X<X$, it is considered that the color temperature data $D_T$ remains unchanged, and the flag K is reset. At the same time, the content of the flag K is considered as that of the flag L and the counter F is reset (Steps 104, 109, and 111).

Also, when $D_X \leqq -X$, the flag K is reset in Step 106 and then the program advances to Step 107 in a similar manner to the previous case. In the illustrated embodiment, as shown in FIG. 3(d), the values of the color temperature data $D_T$ show an ascending tendency over a period of the times $t_1$~$t_5$, and the difference $D_X$ is considered for this period that $D_X \geqq X$.

Therefore, in Step 103 it is decided that $D_X \geqq X$, the flag K is set, and whether or not K=L is checked (Steps 105, 107). Here, since the previous state of the flag K, is considered with the flag L and L=0, in Step 107 it is decided that K≠L, because the content of the flag K(=1) is considered as the content of the flag L, and the counter F is reset (Steps 109, 111). Processing in Steps 112≠117 are executed similarly.

At a time when the routine is executed further three times under the state of $D_X \geqq X$ after the counter F is reset substantially at the time $t_2$ in the above-mentioned manner. At a time $t_5$ when the content of the counter F is three of F=3, the color temperature data $D_T$ that is input at the time from the A/D converter 56 is substituted for the color temperature data $D_O$ in Step 116. This also applies when the tendency of $D_X \leqq -X$ continues for a period the times $t_1 \sim t_5$. In other words, when the color temperature of the field varies continuously in the same direction with a width greater than or equal to a value (in the illustrated embodiment, when the state of $|D_X| \geqq X$ continues four cycles with each cycle being one vertical synchronization signal VD (1/60 sec.), the color temperature data $D_O$ to be used for the white balance adjustment is updated by the color temperature data $D_T$ that is input at the time (in the illustrated embodiment, at the time $t_5$).

On the other hand, if the photographic mode is set in the movie mode, when the state of $|D_X| \geqq X$ continues 60 cycles with each cycle being one vertical synchronization signal VD (or when F=59), the color temperature data $D_O$ is updated by the input color temperature data $D_T$ (Steps 118 and 116).

As described above, in the illustrated embodiment, when the color temperature of the field varies continuously in the same direction with a width greater than or equal to a given value, the still mode and the movie mode are different from each other in the cycles thereof for updating of the color temperature data $D_O$. In particular, in the still mode, the updating of the color temperature data $D_O$ is executed every time $T_1$ (=1/60×4=66.4 msec.) in which the vertical synchronization signal VD is output 4 times, while, in the movie mode, the color temperature data $D_O$ is updated every time $T_2$ (=1/60×60=1 sec.) in which the vertical synchronization signal VD is output 60 times.

According to the present embodiment, the response property, which extends from the input of the color temperature data up to the initiation of a processing of a signal to be used for the white balance adjustment, can be altered properly according to the photographic mode set.

Figure 4:
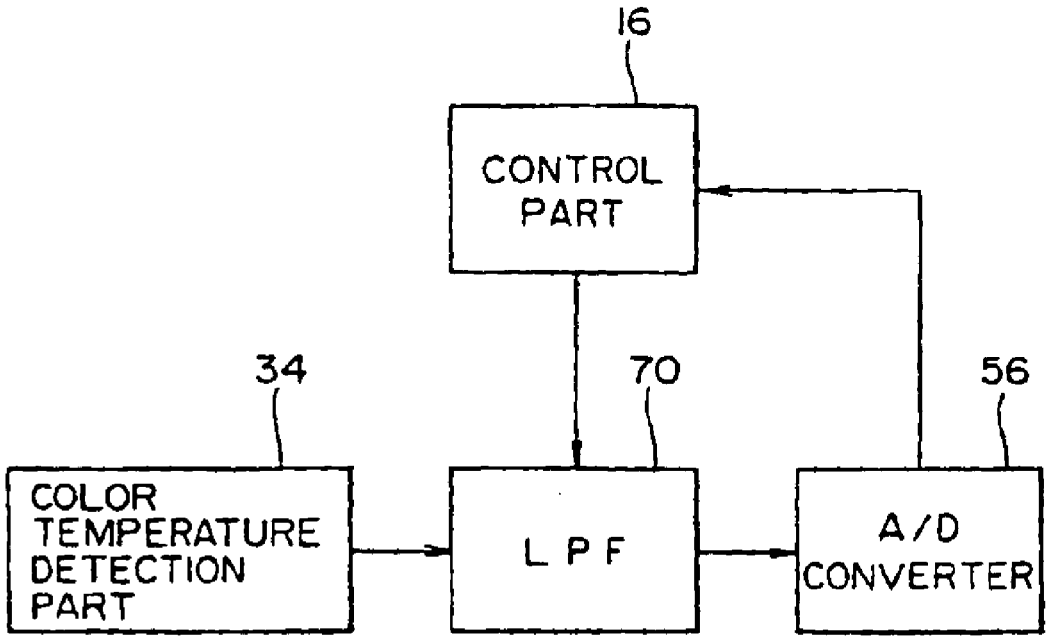

In the present embodiment, the above-mentioned response property according to the set photographic modes can be obtained by use of the program that is executed by the control part 16, but the present invention is not limited to this. For example, as shown in FIG. 4, a response property according to the photographic modes can be obtained by interposing between the color temperature detection part 34 and the A/D converter 56 a low pass filter 70 having a time constant CR which can be altered by a capacitor C, a resistor R and an analog switch, and by switching the analog switch of the low pass filter 70 in accordance with the photographic modes by a control signal output from the control part 16 to thereby alter the time constant CR of the low pass filter 70. In this case, as a matter of fact, in the still mode the time constant of the low pass filter 70 is set smaller than in the movie mode.

Also, although in the above-mentioned embodiment the description has been given for a case in which the present invention is applied to the electronic still camera, the present invention is not limited to the electronic still camera, but, for example, the invention can also be applied to a case in which a VTR is provided with an electronic shutter function for still photography.

As has been described heretofore, because the present invention is constructed such that, during the sequential photographing operation, the updating of the color temperature data to be used for the white balance adjustment is prohibited, according to the invention, the homogeneity of the main object can be maintained free from the variations of the color temperature of the field when photographing still images in the sequential photographic mode.

Also, due to the fact that in the present invention the response time, which extends from the detection of the field color temperature by the color temperature detection device to the execution of the white balance adjustment by the control device, can be altered, according to the invention, and the white balance can be adjusted properly according to the photographic modes.

It should be understood, however, that there is no intention to limit the invention to the specific forms disclosed, but on the contrary, the invention is to cover all modifications alternate constructions and equivalents falling within the spirit and scope of the invention as expressed in the appended claims.

What is claimed is:

[1. A white balance adjusting device for use in a camera having at least a single photographic mode in which, when a shutter release operation is performed, an image of a field is picked up by a single frame and a video signal representing the still image thereof is formed and a sequential photographic mode in which, while said shutter release operation is being performed, the images of said field are picked up sequentially for every predetermined period of time and video signals respectively representing the still images thereof are formed, said white balance adjusting device comprising:

single/sequential photographic mode setting mode setting means for setting said single photographic mode and said sequential photographic mode;

operation means for performing said shutter release operation;

color temperature detecting means for detecting a color temperature of said field and outputting a color temperature signal representing said color temperature; and control means for adjusting a white balance of said video signal in response to color temperature data that is obtained from said color temperature signal, said control means receiving a set output from said single/sequential photographic mode setting means and an output signal from said operation means and prohibiting said color temperature data that is used for adjusting said white balance from being updated when a sequential photographic operation is being performed.]

[2. A white balance adjusting device for use in a camera as set forth in claim 1, wherein said color temperature detecting means comprises:

a color temperature detection element for outputting a first photocurrent signal corresponding to an R component of an incident light from said field and a second photocurrent signal corresponding to a B component of said incident light;

a logarithmic conversion circuit for receiving a detection output from said color temperature detection element, compressing said detection output logarithmically and outputting an R signal and a B signal respectively corresponding to said R and B components of said incident light;

a subtraction circuit for calculating a difference between said R and B signals output from said logarithmic conversion circuit; and an amplifier for amplifying a subtraction output signal from said subtraction circuit up to a predetermined level.]

[3. A white balance adjusting device for use in a camera as set forth in claim 2, wherein said color temperature detection element comprises a first photo diode for receiving only said R component of said incident light from said field and a second photo diode for receiving only said B component of said incident light, wherein said first and second photo diodes are connected in series to each other in such a manner that the respective cathodes thereof are directly connected to each other for allowing said first and second photo diodes to have mutually opposite polarities.]

4. A white balance adjusting device for use in a camera in which a field is photographed and a video signal representing said field is formed, said device comprising:

photographic mode setting means for setting a still mode for photographing said field as a still image and a movie mode for photographing said field as a moving image;

color temperature detecting means for detecting a color temperature of said field and outputting a color temperature signal representing said color temperature; and control means for adjusting a white balance of said video signal in response to color temperature data that is obtained from said color temperature signal, said control means receiving a set output from said photographic mode setting means and adjusting said white balance of said video signal at a shorter cycle as compared with said movie mode when said camera is set in said still mode;

*wherein when the still mode is set by the photographic mode setting means, the control means obtains the color temperature signal used for the white balance adjustment so that a first response time length between the detection of the color temperature by the color temperature detecting means and the white balance adjustment for the image signal of the still image is at most a predetermined time length;*

*wherein when the movie mode is set by the photographic mode setting means, the control means obtains the color temperature signal from the color temperature detecting means so as to adjust the white balance of the image signal composing the moving image if the color temperature of the field varies while the photographing of the moving image is continuously performed in the movie mode, and the control means obtains the color temperature signal used for the white balance adjustment so that a second response time length between the detection of the color temperature by the color temperature detecting means and the white balance adjustment for the image signal of each of frames composing the moving image is longer than the predetermined time length and is longer than a photographing cycle of the frames composing the moving image.*

5. A white balance adjusting device for use in a camera as set forth in claim 4, wherein said color temperature detecting means comprises:

a color temperature detection element for outputting a first photocurrent signal corresponding to an R component of an incident light from said field and a second photo current signal corresponding to a B component of said incident light;

a logarithmic conversion circuit for receiving a detection output from said color temperature detection element, compressing said detection output logarithmically and outputting an R signal and a B signal respectively corresponding to said R and B components of said incident light;

a subtraction circuit for calculating a difference between said R and B signals output from said logarithmic conversion circuit; and an amplifier for amplifying a subtraction output signal of said subtraction circuit up to a predetermined level.

6. A white balance adjusting device for use in a camera as set forth in claim 5, wherein said color temperature detection element comprises a first photo diode for receiving only said R component of said incident light from said field and a second photo diode for receiving only said B component of said incident light, wherein said first and second photo diodes are connected in series to each other in such a manner that the respective cathodes thereof are directly connected to each other for allowing said first and second photo diodes to have mutually opposite polarities.

*7. The white balance adjusting device for use in the camera as defined in claim 4, wherein:*

*the color temperature detecting means sequentially detects color temperatures of the field at a predetermined cycle and sequentially outputs first color temperature signals representing the detected color temperatures; and*

*when the movie mode is set by the photographic mode setting means, the control means sequentially compares each of the first color temperature signals sequentially outputted from the color temperature detecting means with a second color temperature signal currently used for the white balance adjustment, and if color temperature change conditions in which a difference between the each of the first color temperature signals and the second color temperature signal is at least a constant value occur a first number of times, then the control means obtains a latest first color temperature signal and updates the second color temperature signal used for the white balance adjustment by the latest first color temperature signal.*

*8. The white balance adjusting device for use in the camera as defined in claim 7, wherein when the movie mode is set by the photographic mode setting means, the control means sequentially compares each of the first color temperature signals sequentially outputted from the color temperature detecting means with the second color temperature signal currently used for the white balance adjustment, and if color temperature changing conditions in which symbols of the differences between the first color temperature signals and the second color temperature signal are the same and absolute values of the differences are at least the constant value occur sequentially the first number of times, then the control means obtains the latest first color temperature signal and updates the second color temperature signal used for the white balance adjustment by the latest first color temperature signal.*

*9. The white balance adjusting device for use in the camera as defined in claim 4, wherein when the still mode is set by the photographic mode setting means, the control means compares a first color temperature signal outputted from the color temperature detecting means with a second color temperature signal currently used for the white balance adjustment, and if a color temperature change condition in which a difference between the first color temperature signal and the second color temperature signal is at least a constant value occurs, then the control means obtains a latest first color temperature signal and updates the second color temperature signal used for the white balance adjustment by the latest first color temperature signal.*

*10. The white balance adjusting device for use in the camera as defined in claim 7, wherein when the still mode is set by the photographic mode setting means, the control means sequentially compares each of the first color temperature signals sequentially outputted from the color temperature detecting means with the second color temperature signal currently used for the white balance adjustment, and*

*if color temperature change conditions in which a difference between the each of the first color temperature signals and the second color temperature signal is at least a constant value occur a second number of times, the second number being less than the first number, then the control means obtains a latest first color temperature signal and updates the second color temperature signal used for the white balance adjustment by the latest first color temperature signal.*

*11. The white balance adjusting device for use in the camera as defined in claim 8, wherein when the still mode is set by the photographic mode setting means, the control means sequentially compares each of the first color temperature signals sequentially outputted from the color temperature detecting means with the second color temperature signal currently used for the white balance adjustment, and if color temperature changing conditions in which symbols of the difference between the first color temperature signal and the second color temperature signal are the same and absolute values of the differences between the first color temperature signal and second color temperature signal are at least the constant value occur sequentially a second number of times, the second number being less than the first number, then the control means obtains the latest first color temperature signal and updates the second color temperature signal used for the white balance adjustment by the latest first color temperature signal.*

*12. The white balance adjusting device for use in the camera as defined in claim 4, wherein:*

*the still mode which is set by the photographic mode setting means includes a single mode for photographing the field by a single frame and a sequential mode for sequentially photographing the field at constant intervals; and*

*when the sequential mode is set by the photographic mode setting means, the control means prohibits updating the color temperature signal that is used for the white balance adjustment at a photographing of a first frame during the sequential photographing after the first frame.*

*13. A white balance adjusting system for a camera, comprising:*

*a mode setting device configured to set the camera in one of a still mode and a movie mode, wherein in the still mode a field is photographed as one or more still images and wherein in the movie mode, the field is photographed as a continuously moving image;*

*a color temperature detecting device configured to detect a color temperature of the field; and*

*a controlling device operatively connected to the mode setting device and the color temperature detecting device, wherein the controlling device is configured to adjust white balance of a video signal in response to the color temperature detected by the color temperature device,*

*wherein in the movie mode, the controlling device initially sets and periodically updates the white balance of the video signal of the continuously moving image and wherein a length of time between updates is longer than a photographing cycle of frames composing the moving image.*

*14. The white balance adjusting system of claim 13, wherein the still mode includes a single mode and a sequential mode, wherein the field is photographed in a single frame in the single mode and the field is sequentially photographed in corresponding frames at constant intervals, and wherein the controlling device initially sets but prevents further updates to the white balance of the video signal when in sequential mode.*

*15. The white balance adjusting system of claim 13, wherein in the movie mode, the controlling device is configured to update the white balance of the video signal if a difference between a previous color temperature corresponding to a white balance prior to the update and a current color temperature is greater than a preset value.*

*16. A method to adjust white balance for a camera, the method comprising:*

*setting the camera in one of a still mode and a movie mode according to a selection from a user, wherein in the still mode a field is photographed as one or more still images and wherein in the movie mode, the field is photographed as a continuously moving image;*

*detecting an initial color temperature of the field; and*

*initially setting a white balance of a video signal in response to the detected initial color temperature; and*

*periodically updating the white balance of the video signal of the continuously moving image if the camera is in the movie mode, wherein a length of time between updates is longer than a photographing cycle of frames composing the moving image.*

*17. The method of claim 16, wherein the still mode includes a single mode and a sequential mode, wherein the field is photographed in a single frame in the single mode and the field is sequentially photographed in corresponding frames at constant intervals, the method further comprising preventing further updates to the white balance of the video signal when the camera is in the sequential mode.*

*18. The method of claim 16, wherein the periodically updating step comprises:*

*detecting a current color temperature of the field; and*

*updating the white balance of the video signal if a difference between a previous color temperature corresponding to the white balance prior to the update and the current color temperature is greater than a preset value.*

*19. The method of claim 16, wherein the periodically updating step comprises:*

*sequentially detecting color temperatures of the field at predetermined cycles; and*

*updating the white balance of the video signal if:*

*a direction of a color change is same for a predetermined consecutive cycles, and*

*an amount of color temperature change between each of the consecutive cycles is equal to or greater than a predetermined value.*

* * * * *